Sept. 17, 1968 H. G. YETTER 3,401,507
ROLL SCRAPER BAR FOR HAY CONDITIONING MACHINE
Filed June 6, 1966 3 Sheets-Sheet 1

Inventor.
Harry G. Yetter.
By W. F. Kellogg. Atty.

United States Patent Office 3,401,507
Patented Sept. 17, 1968

3,401,507
ROLL SCRAPER BAR FOR HAY CONDITIONING MACHINE
Harry G. Yetter, Colchester, Ill. 62326
Filed June 6, 1966, Ser. No. 570,105
10 Claims. (Cl. 56—1)

ABSTRACT OF THE DISCLOSURE

A scraper for one of the superposed rolls of a hay conditioning machine having a blade swingably mounted with relation to and scrapingly engageable with and along the peripheral surface thereof, the blade being capable of and mounted for torsional movement throughout its length upon movement of the one roll to a canted position relative to the other roll to mainain said peripheral scraping engagement.

The invention relates to improvements in hay conditioning machines, particularly, though not necessarily, to those types of machines generally identified in the industry as hay crimping machines; more specifically, to a device for preventing the wrapping or cleaving of green stemmed vegetation such as grasses, clover and other cultivated or uncultivated vegetation (weeds) about the rolls thereof.

It is well recognized in the art that timeliness is an important factor in the production of hay; that loss of quality therein occurs from excessive swath bleaching and/or fermentation, as by allowing the cut grasses and/or clover, etc. to dry too long, causing loss of color and carotene in the product. Moreover, excessive drying results in an inferior grade of hay in that the leaves of clover, and other, are shattered and lost when the hay is raked. Thus an accelerated ventilation of the hay and the rapid yet thorough evaporation of moisture therefrom is essential.

To the attainment of satisfactory haying results, different forms or kinds of hay conditioning machines have been developed and used, functioning to break the skin of the hay stems by bending, bruising, crushing, scraping or splitting the same between fluted and smooth rolls. Whereas these machines have been operative to an extent, the end results have been generally unsatisfactory, due to clogging of the rolls as by coarse stemmed weeds plus the cleaving or adhesion of the treated green stems to, and their wrapping about said rolls in amounts which prevent their effective functioning. Corrective efforts, insofar as I am aware, have been unsuccessful and so, unsatisfactory. One such (and failing) effort has been the development of and providing mechanical means to the crimping or crushing rolls, functioning to release their pressure, thus aiding the manual clearing of clogging matters therefrom.

Conversely, my invention, which can be quickly and simply installed on roll types of hay conditioning machines of the stem crimping specie, affords positive and satisfactory means whereby grasses, clover, coarse stemmed weeds and/or other vegetation can and will be satisfactorily prevented from wrapping about and adhering to the smooth surface roll, hence clogging the paired crimping rolls of an equipped roll crimping type of hay conditioning machine, and which if accumulated thereon, will be effectively, quickly and wholly removed, thereby assuring its continuous operation and eliminating the need for hand effected cutting of the same away from the crimping rolls. Moreover, forage treated by a thus equipped machine will be assured of rapid evaporation of moisture therefrom, hence the preservation of leafiness, color and nutritive content.

It is an object of the invention to provide a device of relatively simple and uncostly construction which may be readily and operatively installed as original equipment of new hay conditioning machines, likewise, installed on used machines without material adjustment or modfication of their components or the impairment of satisfactory objective performance.

It is also an object of the invention to provide a roll clearing device for hay conditioning machines which will operate automatically, whereby to prevent the accumulation or wrapping of prohibitive or roll clogging amounts of grasses, clover and/or other cultivated, as well as uncultivated (weeds), stemmed vegetation over and about the smooth surface crimping rolls thereof, or portions thereof, hence assuring their continuous and effective operation.

Yet another and equally important objective of my invention is to provide a device of the stated character which is of such construction and design as will assure its self-adjustment with relation to the equipped and operating smooth surface crimping roll of a hay conditioning machine whereby to avoid clogging of its paired hay treating rolls (smooth and fluted) or otherwise causing them to be operationally impeded by the accumulation of vegetation on and about the same, thus making certain the satisfactory crimping or treatment of such vegetation and the accelerated evaporation or drying of moisture therefrom.

The foregoing, as well as other objects, advantages and meritorious teachings of my invention, will be in part obvious and in part pointed out in the following detailed disclosure thereof, when taken in conjunction with the accompanying drawings, it being understood that the form of invention presented herein is precise and what is now considered to be the better mode of embodying its principles, but that other and further modifications and changes may be made in specific embodiment without departing from its essential features.

In the drawings:

FIGURE 1 is an elevation of one end of the hay treating rolls supporting frame illustrating one of the pivotal arms for swingably mounting the upper and smooth surface roll scraper blade with a portion of the arm adjacent the scraper blade end being broken away to better illustrate its mounting and position relative to said upper roll, plus the means for transmitting clockwise and counterclockwise rotary motion to said rolls;

FIGURE 4 is a schematic end view of the forage or vegetation treating rolls and scraper blade, the latter in scraping relation to the upper smooth surface roll;

FIGURE 5 is a schematic side view of the forage or vegetation treating rolls (fluted and smooth) showing the scraper blade in operative relation to the smooth roll, as in FIGURE 4;

FIGURE 6 is a view like FIGURE 4 but wherein the upper or smooth surface roll is shown in canted relation to the lower fluted roll, as when an uneven or a prohibitive quantity of forage or vegetation (cultivated or uncultivated) is delivered to and between said rolls, often causing their clogging; and FIGURE 7 is a view like FIGURE 6 showing the scraper blade in automatically adjusted scraping relation to the smooth roll.

Figure 1:
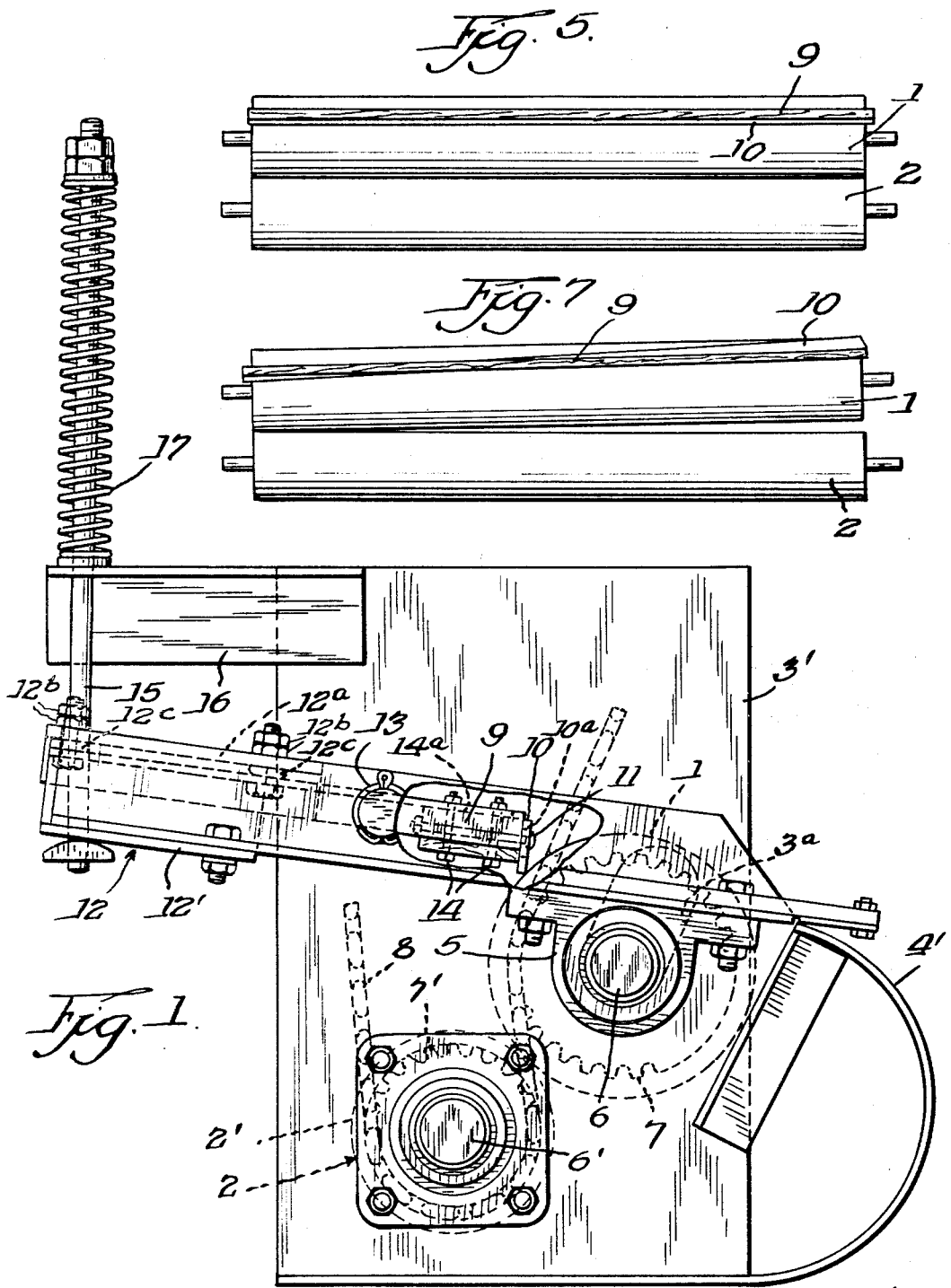

Referring in detail to the drawings, the invention is installed on that type of hay conditioning machine including a pair of juxtaposed substantially parallel rolls 1 and 2, each provided with coaxially disposed stub axles. The axles of the roll 2 are journalled in suitable bearings in upright supporting frame plates 3 and 3', the bottoms of which fixedly receive and support runners 4 and 4' whose forward portions are upwardly curved or bowed and anchored, as shown in FIGURE 1.

The stub axles of the roll 1 are slidably received within the upwardly and forwardly inclined slots or ways 3a formed in each of the upright supporting frame plates 3 and 3' and journalled in suitable bearing 5 mounted on forward portions of arms 12 pivotally mounted on the frame plates, hereinafter more fully described, whereby to permit upward shifting movement thereof and the smooth surface roll 1 with relation to the fluted roll 2, the purpose of which will be hereinafter described.

Certain of said stub axles of the rolls 1 and 2 are extended from and beyond the frame plate receiving them, as indicated at 6 and 6', and have sprockets 7 and 7' mounted thereon outwardly of the plate, about which a sprocket chain 8 is engaged, said chain being further engaged with and driven by or from a suitable power transmitting means (not shown) for imparting clockwise and counterclockwise rotation, respectively, to the sprockets 7 and 7', hence to their rolls 1 and 2.

The roll 1, as aforesaid, is formed with a smooth peripheral surface, while the periphery of the roll 2 is spirally fluted or ribbed as at 2', in order that forage or vegetation passing thereover and by the smooth surface roll 1 will be effectually treated, that is, crimped, bent, and/or crushed for accelerating and improving its curing into hay.

As shown in the FIGURES 4 and 5, the smooth and spirally fluted rolls 1 and 2 are normally in substantially parallel relation, with the fluted roll 2 rearwardly offset in relation to the smooth roll 1 whereby to facilitate the gathering or "picking up" of the to-be conditioned or treated forage and carrying it thereover into engagement with and by the smooth surface roll for crimping or conditioning treatment.

However, if certain amounts of forage are introduced between said rolls and wrapped on and about the upper and smooth surface roll 1 it will be shifted upwardly, possibly, if not probably, to a canted position with relation to the fluted roll 2, as shown in FIGURES 6 and 7. In consequence, the rolls will be clogged by the wrapping or cleaving of vegetation about the roll 1, causing their malfunctioning.

Figure 2:
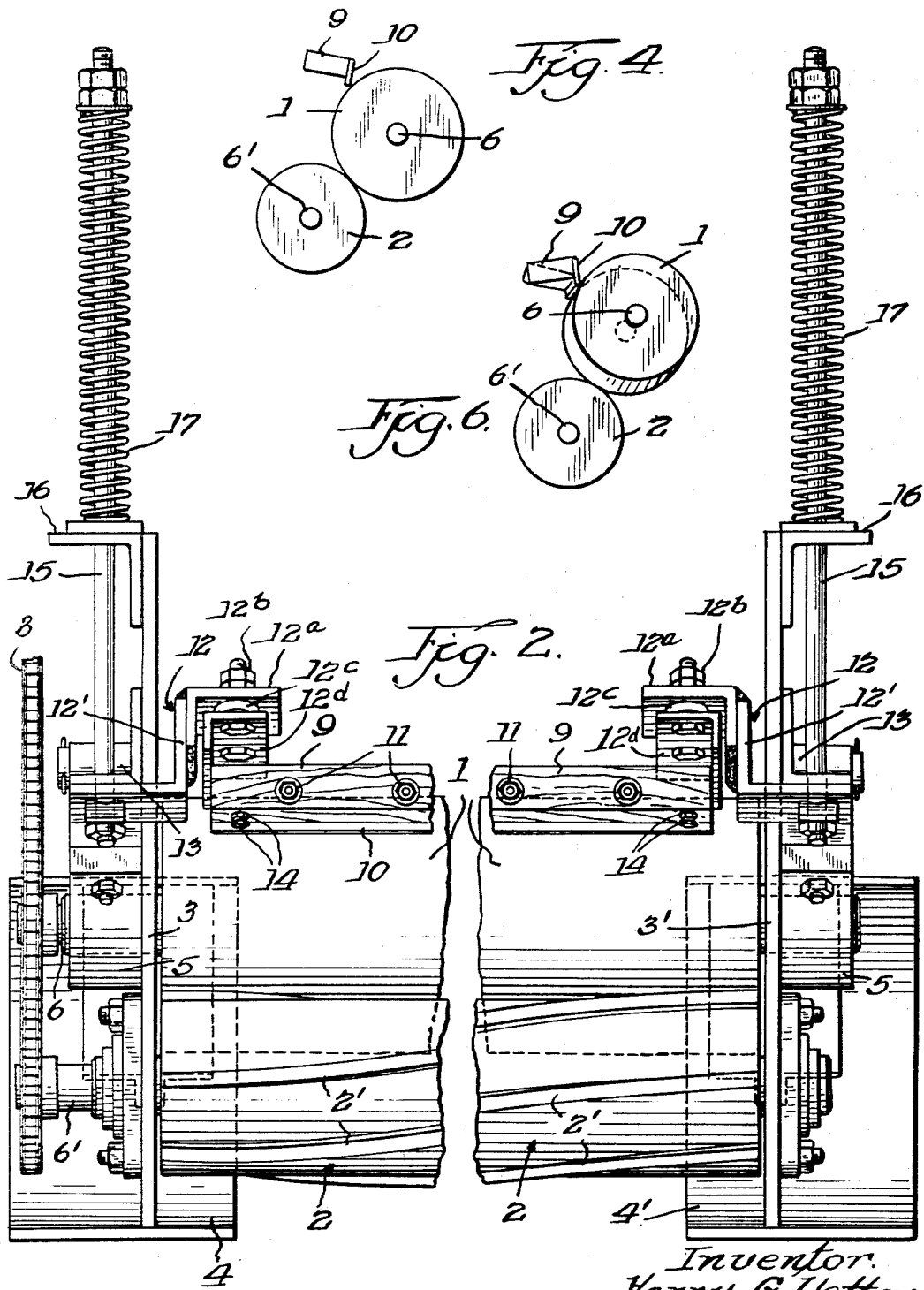
FIGURE 2 is a rear elevation wherein the intermediate portions of the rolls and scraper blade are broken away.
Figure 3:
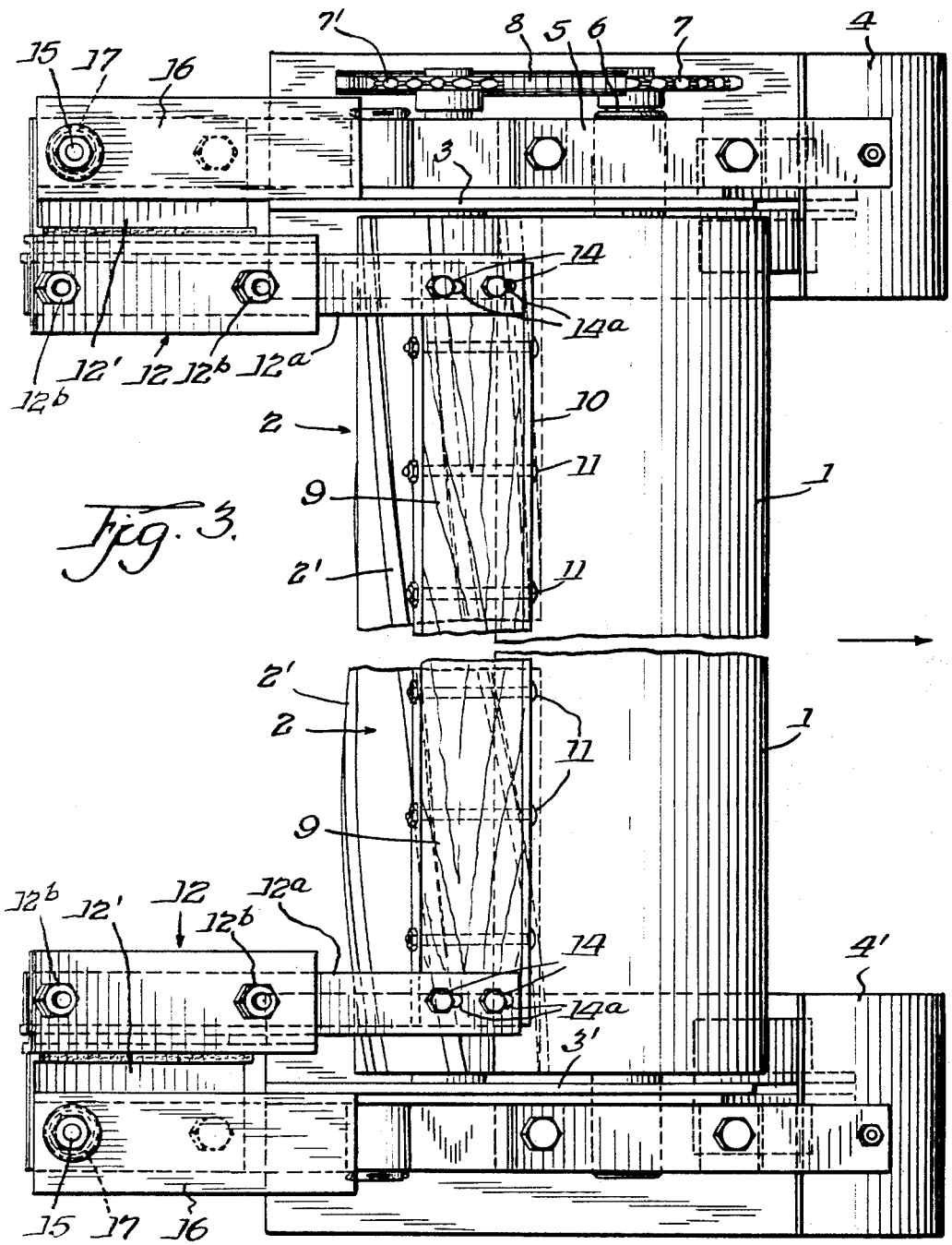
FIGURE 3 is a top view thereof.

To prevent or correct such clogging and ensure continuous and/or uninterrupted as well as proper treatment of the forage is the primary objective of my invention, which comprises or consists of a preferably wooden bar 9 of a length substantially corresponding to that of the rolls 1 and 2, disposed longitudinal of and supported in juxtaposed and normally substantially parallel relation to the upper and rearward portion of the smooth surface roll 1 between the upright frame supporting plates 3 and 3' (see FIGURES 1, 2 and 3). Being of wood, the bar is capable of absorbing and withstanding limited torsional stresses. A steel blade 10 having its opposite end portions transversely slotted as at 10a (see FIGURE 1) is bolted as at 11 or otherwise vertically adjustably secured to the forward side of the bar, having its scraping edge extended downwardly therefrom normally into scraping engagement with the smooth periphery of the roll.

To support the bearings 5 in which the stub axles of the roll 1 are journalled, and the bar 9 and scraping blade 10 in the aforesaid relation to the smooth surface roll 1, arms, generally indicated by the reference numeral 12, are pivotally mounted, as at 13, on and adjacent the outer upper and rearward sides of the plates 3 and 3' (see FIGURES 1, 2 and 3) above and rearwardly of said roll 1; the bearings 5 being bolted or otherwise securely mounted on forward portions of said arms, as shown in FIGURE 1.

Each arm 12 comprises an angle bar 12' having a relatively inverted angle bar 12a welded or otherwise secured to its vertical side and disposed inwardly thereof. A second angle bar 12d is arranged immediately below and parallel to the angle bar 12a and is adjustably connected thereto by bolts 12b provided with duplicate locking nuts. Rubber or similar cushioning material constituted washers 12c are mounted on the bolts 12b between the angle bar 12a and its companionate lower and relatively parallel angle bar 12d, thus effecting a cushioned mounting of the latter on and with respect to the former.

The end portions of the wooden bar 9 are adjustably connected to the forward ends of each of said parallel angle bars by longitudinal slotting the same whereby to receive bolts 14 therethrough and through the adjacent portions of said wooden bar 9. Hence the wooden bar is capable of being relatively adjusted longitudinally of or with relation to its mounting angle bars, either toward or away from the smooth surface roll 1.

In order that the inner end portions of the arms 12 will be normally and yieldably thrust downwardly, vertically disposed rods 15 are adjustably, though securely, mounted on the rearward end portions thereof (FIGURES 1 and 2) and slidably received through suitable openings in rearwardly extended horizontally disposed support arms 16 mounted on the upper sides of each of the supporting plates 3 and 3'. Compression coiled springs 17 are received on and over the upper or extended portions of the rods having seating or bearing on adjacent portions of the support arms. Hence, it will be understood that the forward or inner end portions of the arms and the scraper blade 10, will, as stated above, be normally thrust downward with respect to the roll 1, the degree of pressure of such being selectively adjustable through tensioning of the springs 17.

In usage of my invention it will, of course, be understood that the frame supporting plates 3 and 3' are preferably provided with carrying wheels (not shown) whereby to afford mobility thereto and, of course, to the invention equipped hay conditioning machine. The machine is adapted to be drawn (propelled) over a field by a tractor, the power "take off" or drive of which is connected to the sprocket chain 8, geared or connected to the sprocket wheels 7 and 7' of the hay conditioner rolls 1 and 2. As the invention equipped hay conditioning machine is drawn over the field whereon swaths of hay are present, the machine is moved in straddling fashion over said swaths which are gathered up by the counterclockwise rotating fluted roller 2' and carried upwardly thereover by and between the juxtaposed upper smooth surface roll 1. Thereby, the stems and leaves of the gathered forage or vegetation are crimped, crushed, or otherwise treated, and discharged from the rolls back onto the field surface in loose lying swaths through which air may and will freely pass and/or circulate, thereby effecting its curing into hay.

If curing operation of the equipped hay conditioning or crimping machine, the gathered forage or vegetation wraps or cleaves about the smooth surface roll 1, it will be seen that said roll will be moved or swung upwardly on its spring pressed supporting arms 12 away from the fluted roll 2. Should the thus wrapped or cleaved forage be unevenly distributed on or over the roll 1, it will move to a canted position with relation to the lower and fluted roll 2, as shown in the FIGURES 6 and 7 of the drawings, and probably cause malfunctioning of both rolls. However, because of the mounting of the scraper blade 10 on the wooden bar 9 and its pressured engagement or contact with the smooth periphery of the roll 1, the wrapped or cleaved forage will be fully and promptly removed therefrom, permitting the continued and effective hay crimping operation.

To adjust the degree of pressure with which the scraper blade 10 engages the smooth peripheral surface of the roll 1 whereby to assure its forage cutting and/or removing efficiency, the locking nuts of each of the forwardly disposed bolts 12b are tightened, thus raising the forward ends of the arms 12. At this time, the scraper blade 10 may be adjusted or moved downwardly with respect to the wooden bar 9 by loosening the bolts 11 in order to effect the desired adjustment thereof on or with relation to the smooth surface roll 1. Thereupon the blade is resecured to the bar 9 by tightening the bolts 11. At this time, the locking nuts on the forwardly disposed bolts 12b are loosened, allowing the rubber washers mounted thereon to expand and the lower and parallel angle bars to fulcrum or swing downwardly on the rearwardly disposed and cushioned bolts 12b, thereby engaging the scraper blade 10 with the periphery of the roll 1 at the desired or required pressure.

Should the excessive or unevenly distributed amounts of forage or hay cause the smooth surface roll 1 to be raised or forced upwardly to a canted position with relation to its cooperating roll 2, as shown in the FIGURES 6 and 7 of the drawings, it will be understood that because the scraper blade 10 and its mounting bar 9 are capable of torsional movement, said scraper blade will be maintained in full or complete scraping engagement with the smooth peripheral surface of the roll 1, as shown in FIGURES 6 and 7 of the drawings, returning to its normal relative positioning as and when such torsional stresses are discontinued.

I claim:
1. A mobile hay crimping machine including:
 (a) a supporting frame;
 (b) a pair of superposed rolls mounted on the frame transversely thereof;
 (c) one of said rolls being movable toward or away from the other thereof having a smooth peripheral surface; and
 (d) a blade movably mounted on the frame disposed in substantially parallel relation to said one roll scrapingly engaging a smooth peripheral surface thereof substantially throughout its length,
 (e) and said blade including means for mounting it for torsional movement throughout its length, with movement of said one roll to canted positions with relation to the other roll whereby to remain in constant scaping engagement with the periphery of said one roll.

2. The structure of claim 1 further characterized in that the peripheral surface of the other of said rolls is spirally fluted throughout its length.

3. The structure of claim 1 further characterized in that the rolls and the blade are normally in substantially parallel relationship.

4. The structure of claim 1 further characterized in that the blade is swingably mounted on the frame with relation to the smooth peripheral surface of said one roll.

5. The structure of claim 1 further characterized in that the blade is formed of inherently spring material.

6. The structure of claim 1 further characterized in that the blade is bodily adjustable throughout its length whereby to remain in scraping contact with the periphery of said one roll irrespective of the character of its movement and positioning with relation to the remaining roll.

7. A mobile hay crimping machine, including:
 (a) a supporting frame;
 (b) a roll journalled in bearings on the frame disposed transversely thereof;
 (c) a second roll in substantially juxtaposed and normally parallel relation to the first roll swingably mounted on the frame movable toward and away from said first roll; and
 (d) a blade movably mounted on the frame in substantially parallel relation to the second roll scrapingly engaging the peripheral surface thereof,
 (e) and said blade including means for mounting it for torsional movement throughout its length, with movement of said one roll to canted positions with relation to the other roll whereby to remain in constant scraping engagement with the periphery of said one roll.

8. The structure of claim 7, further characterized in that the peripheral surface of the rolls is spirally fluted throughout its length.

9. The structure of claim 7 further characterized in that the blade is swingably mounted on the frame and movable collectively with said second roll.

10. The structure of claim 7 further characterized in that the blade is bodily adjustable throughout its length whereby to remain in scraping contact with the periphery of said second roll irrespective of the extent or character of its movement and positioning with relation to the first roll.

References Cited

UNITED STATES PATENTS

| 2,592,269 | 4/1952 | Getz | 56—1 |
| 2,727,347 | 12/1955 | Fenster et al. | 56—1 |
| 2,790,289 | 4/1957 | Tufford | 56—1 |
| 2,829,481 | 4/1958 | Jarvis | 56—1 |
| 2,991,611 | 7/1961 | McCarty | 56—1 |
| 3,139,717 | 7/1964 | Fischer | 56—23 |
| 3,241,300 | 3/1966 | Fell et al. | 56—23 |
| 3,306,014 | 2/1967 | Halls et al. | 56—23 |
| 3,357,467 | 12/1967 | Morkoski | 146—117 |
| 3,375,643 | 4/1968 | McCarty et al. | 56—23 |

ALDRICH F. MEDBERY, *Primary Examiner.*